US007386764B2

(12) United States Patent
LeDuc et al.

(10) Patent No.: US 7,386,764 B2

(45) **Date of Patent: *Jun. 10, 2008**

(54) SYSTEM AND METHOD FOR FAULT DETECTION AND RECOVERY

(75) Inventors: Douglas E. LeDuc, Yorkville, IL (US); John K. Lash, Geneva, IL (US); Nagendra V. Kolluru, Aurora, IL (US)

(73) Assignee: Intel Corporation, Santa Clara, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 11/290,777

(22) Filed: Nov. 29, 2005

(65) Prior Publication Data

US 2006/0143492 A1 Jun. 29, 2006

Related U.S. Application Data

(63) Continuation of application No. 10/145,449, filed on May 13, 2002, now Pat. No. 7,000,154.

(60) Provisional application No. 60/333,871, filed on Nov. 28, 2001.

(51) Int. Cl.
*G06F 11/00* (2006.01)

(52) U.S. Cl. ........................................ 714/48; 714/2

(58) Field of Classification Search .................... 714/2, 714/48

See application file for complete search history.

(56) References Cited

U.S. PATENT DOCUMENTS

| | | | |
|---|---|---|---|
| 5,528,516 | A | 6/1996 | Yemini et al. |
| 5,864,662 | A | 1/1999 | Brownmiller et al. |
| 6,006,016 | A | 12/1999 | Faigon et al. |
| 6,327,677 | B1 | 12/2001 | Garg et al. |
| 6,414,595 | B1 | 7/2002 | Scrandis et al. |
| 6,421,719 | B1 | 7/2002 | Lewis et al. |
| 6,560,725 | B1 | 5/2003 | Longwell et al. |
| 6,604,208 | B1 | 8/2003 | Gosselin et al. |
| 6,738,933 | B2 | 5/2004 | Fraenkel et al. |
| 6,754,854 | B2 | 6/2004 | Kurrasch |

*Primary Examiner*—Michael Maskulinski

(74) *Attorney, Agent, or Firm*—Schwabe, Williamson & Wyatt, P.C.

(57) ABSTRACT

An apparatus and method for automatically detecting and recovering from a fault in a microprocessor-based system. The apparatus and method utilizes a leaky bucket routine and an event handler procedure. The method may further use Object Oriented techniques that abstracts differences between hardware and software faults to allow for the development of a common framework.

22 Claims, 8 Drawing Sheets

SYSTEM AND METHOD FOR FAULT DETECTION AND RECOVERY

RELATED APPLICATION

This application is a continuation of U.S. application Ser. No. 10/145,449 filed May 13, 2002 now U.S. Pat. No. 7,000,154, and claims the benefit of U.S. Provisional Patent Application Ser. No. 60/333,871 filed on Nov. 28, 2001 and which is incorporated herein by reference in its entirety.

BACKGROUND OF THE INVENTION

The present invention relates generally to fault detection and recovery and, more particularly, relates to a system and method for automatically detecting and recovering from software and/or hardware faults in microprocessor-based systems.

Microprocessor-based systems are used in an increasing number of applications, in part, because present day microprocessors are inexpensive and extremely powerful. Many of these systems are sophisticated and have complex software for driving the operation of the microprocessor and other hardware components. Since many of these systems, such as a router in a computer network, must operate continuously and unattended, the systems must be designed to operate in the presence of faults. These faults can be hardware faults or software faults resulting from hardware or software malfunctions.

In most microprocessor-based systems, fault detection and recovery is not implemented. In those rare cases where fault detection and recovery is implemented, the implementation is relatively primitive and informal. Specifically, it is typically left to the discretion of the hardware and software developers to design fault detection and recovery into their software processes which creates many problems. For example, any fault detection and recovery that does exist is tightly coupled and intertwined with the software process so re-use is difficult or impossible. This is especially true since software and hardware faults are typically handled by separate modules and not by one integrated module. Additional problems arise since many software processes are designed to exit when a fault occurs requiring the system to be manually restarted or rebooted to resume operation.

From the foregoing, it will be appreciated that a need exists for a more formal and comprehensive approach to hardware and fault detection and recovery. There is also a need for a fault detection and recovery method that can be easily re-used by any process or module in a system product. Finally, there is a need for fault recovery that is automatic in the sense that manual intervention is not required to recover from the fault.

SUMMARY OF THE INVENTION

In accordance with these needs, the present invention resides in an apparatus and method for automatically detecting and recovering from faults. To this end, faults may be reported as events. Processed events can then be used to increment an error count. Error counts may be based on an individual, family or system basis. The error counts may then be compared with thresholds and recovery functions can be performed if the thresholds are exceeded.

A better understanding of the objects, advantages, features, properties and relationships of the invention will be obtained from the following detailed description and accompanying drawings which set forth exemplary aspects of the invention and which are indicative of some of the ways in which the principles of the invention may be employed.

DETAILED DESCRIPTION

Figure 1:
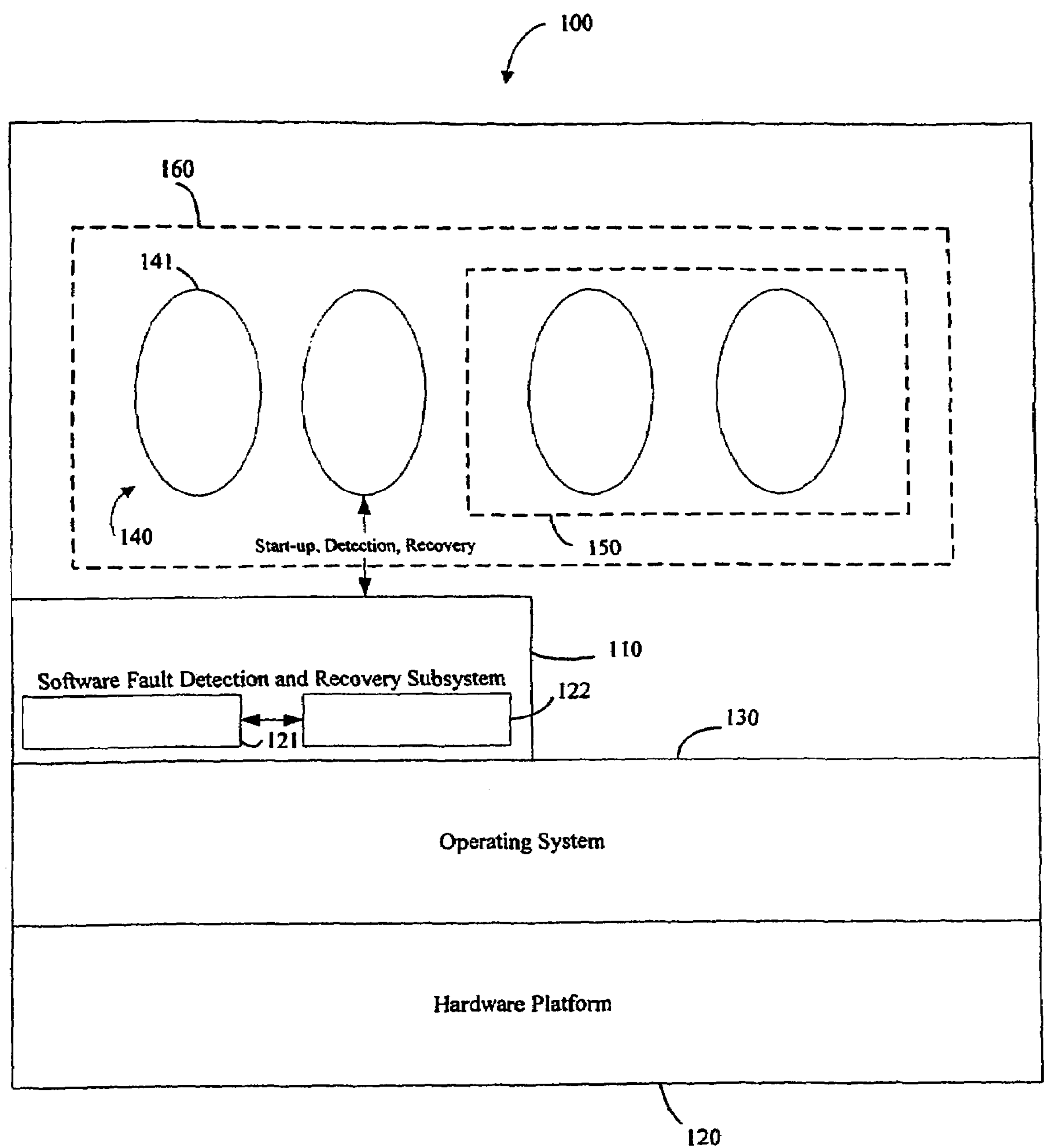
FIG. 1 illustrates a block diagram of an exemplary microprocessor-based system that includes the fault detection and recovery subsystem of the present invention.

Turning now to the figures, wherein like reference numerals refer to like elements, FIG. 1 illustrates a block diagram of an exemplary microprocessor-based system 100 that includes the fault detection and recovery subsystem 110 of the present invention. The microprocessor-based system 100 includes a hardware platform 120, an operating system 130, the fault detection and recovery subsystem 110 of the present invention, and software processes 140. The hardware platform includes a microprocessor. The operating system 130 can be any type of operating system and is embodied in software that resides on the hardware platform 120. The fault detection and recovery subsystem 110 is embodied in software that also resides on the hardware platform 120. The fault detection and recovery subsystem 110 can be divided into modules such as a first module 121 and a second module 122. The software processes 140 can be any type of software processes written in any programming language. The term "process" is used to indicate a series of software instructions that are recognized by the operating system 130 as a single unit. The software processes 140 are also resident on the hardware platform 120. Any number of software processes 140 can reside on the hardware platform 120, with the actual number limited by the operating system 130 and its resources. Four software processes 140 are shown in FIG. 1 for illustrative purposes only.

Figure 2:
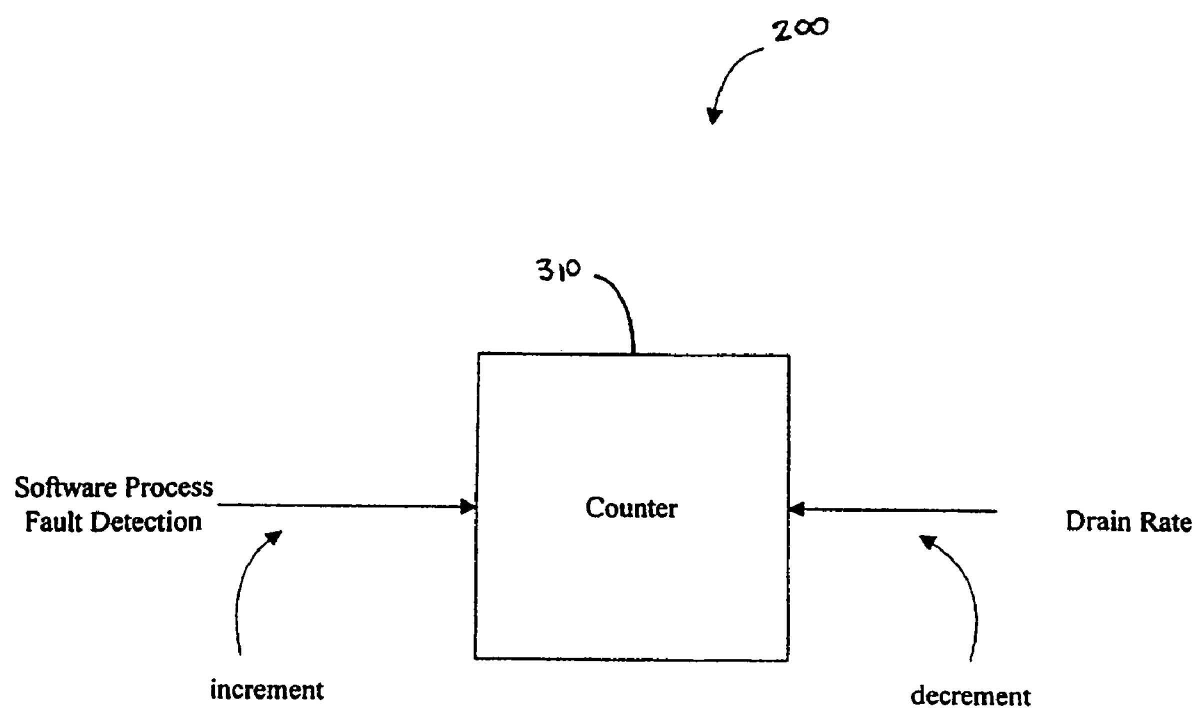
FIG. 2 illustrates a leaky bucket counter for use in the fault detection and recovery subsystem illustrated in FIG. 1.

Turning to FIG. 2, there is illustrated a leaky bucket counter 200 for use in the fault detection and recovery subsystem illustrated in FIG. 1. In accordance with the leaky bucket process, which is preferably implemented in software, a counter 210 is incremented by the detection of a fault. The counter 210 also has a drain rate that decrements the counter 210. By decrementing the counter 210 at the drain rate, the number of detected faults will be smoothed over a period of time. Thus, if there are an unusual number of faults in a unit period of time, they will be detected. The leaky bucket counter 200 provides the ability to design a fault detection and recovery subsystem 110 that expects some faults to occur while providing for a way to perform recovery functions if the rate of faults detected is higher than expected. Adjusting the drain rate attribute allows for adjusting the number of faults in a unit of time that will be tolerated. In a microprocessor-based system 100 that requires zero fault tolerance, the drain rate can be set to zero.

Fault detection and recovery can be implemented partially as a library function called by the software process 141 and partially as processes within the fault detection and recovery subsystem 110 that are independent of the software processes 140 and thus can be used with any software processes 140. Accordingly, an application program interface (API) can be published for the fault detection and recovery subsystem 110 library functions. These library functions may be packaged as a runtime library and linked to the software process 141. In this manner, the software process 141 may call a fault detection and recovery subsystem 110 library function. The library function will then communicate with the independent processes of the fault detection and recovery subsystem 110.

Figure 3:
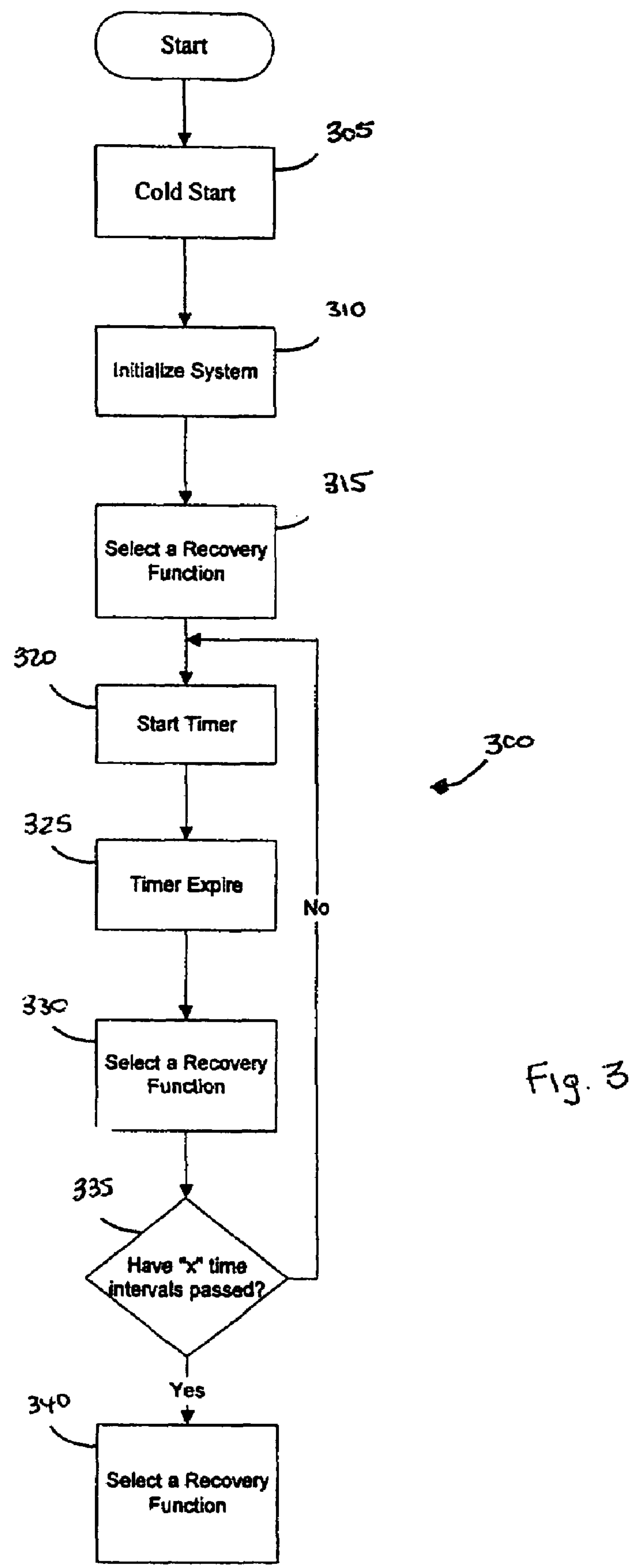
FIG. 3 illustrates a flow chart diagram of an exemplary method for selecting a recovery function as a function of time for use in the fault detection and recovery subsystem illustrated in FIG. 1.

Consideration for the length of time the microprocessor-based system has been running may also be utilized in the fault detection and recovery process. For example, more aggressive recovery functions may be desirable early on in the runtime of the microprocessor-based system 100, while less aggressive recovery functions may be utilized in later stages of the runtime of the microprocessor-based system 100. An example of this is shown in FIG. 3 that illustrates a flow chart diagram of an exemplary method for selecting a recovery function as a function of time. This method facilitates choosing a recovery function based on the time at which a fault occurs during the lifecycle of the microprocessor-based system 100.

In the example illustrated, the microprocessor-based system 100 is started up at step 305. The fault detection and recovery subsystem 110 is then initialized at step 310. At step 315, a first recovery function is selected that will be performed if a fault occurs. Any type of first recovery function may be utilized. For example, the first recovery function may be aggressive if a lot of things need to settle down within the microprocessor-based system 100 shortly after startup making the microprocessor-based system 100 fairly unstable during this time. Restarting, reinitializing, and reconfiguring the hardware and software within the microprocessor-based system 100 is an example of an aggressive recovery function.

At step 320, a timer is set to run for a first time interval. For example, fifteen minutes can be chosen for the first time interval. If a fault occurs within the software process 141 during the first time interval, the first recovery function will be performed by the fault detection and recovery subsystem 110. When the timer has expired at step 325, a second recovery function is selected at step 330 that will be performed if a fault occurs. Any type of second recovery function may be utilized. The second recovery function, for example, may be less aggressive than the first recovery function. For example, the second recovery function could comprise initializing the hardware and software in the microprocessor-based system 100.

If a predetermined number of time intervals have not yet elapsed at step 335, then the method 300 repeats starting at step 320 where a timer is set for a second time interval. If a fault occurs within the software process 141 during the second time interval, the second recovery function will be performed by the fault detection and recovery subsystem 110. The method 300 can be continued for as many time intervals or levels of recovery functions as are desired. For example, a third recovery function selected and then performed if a fault occurs in a third time interval could comprise initializing and reconfigunng only the software in the microprocessor-based system 100. A fourth recovery function selected and then performed if a fault occurs in a fourth time interval could comprise initializing the software in the microprocessor-based system 100. If the predetermined number of time intervals have elapsed at step 335, then a final recovery function is selected 340. If a fault occurs within the software process 141 during the remainder of the run time of the microprocessor-based system 100, the final recovery function will be performed by the fault detection and recovery subsystem 110.

Turning now to FIGS. 4-8, a system and method that utilizes event handling to detect and recover from faults is illustrated. As will be understood by those of skill in the art, an event is something that occurs to a software, hardware, or communication entity in a system. The event may be an indication that a condition (i.e., usually a problem or error) has occurred or is in progress or an indication that a condition has cleared (i.e., the condition is no longer present). Typical software events include interface errors, logic problems, system resource problems, real time problems, thrashing, supporting library failures, and sanity problems. Typical communication events include message timeouts, unexpected responses, receiving garbage/unrecognized data in a message, and underlying communication mechanism failures. Typical hardware events include hardware interrupts, hardware inconsistencies detected during polling, communication failures (typically detected through driver failures), and power/temperature/fan RPM anomalies. Any of these events may be detected through both hardware and software mechanisms. Still further, systems may address events encompassing zero or more of these areas. These events are handled through software that is dedicated to fault tolerance for that area.

It should be further appreciated that not all events are attributable to the element generating the event. In this regard, software failures account for the vast majority of all events encountered, even those reported by hardware elements. For example, drivers (software written to provide software with access to hardware in the system) may have flaws that cause the driver to fail to provide the access to the hardware it supports. On the other hand, the hardware itself may fail and report the same sort of failure event. Communication between software entities may experience problems due to problems in the sending software, problems in the communication mechanism (system calls, drivers, system hardware, or network), or problems in the receiving software. In this case, the problem may exist in any of the three areas. For this reason, it is desirable that events in all areas be handled through a common mechanism.

Figure 4:
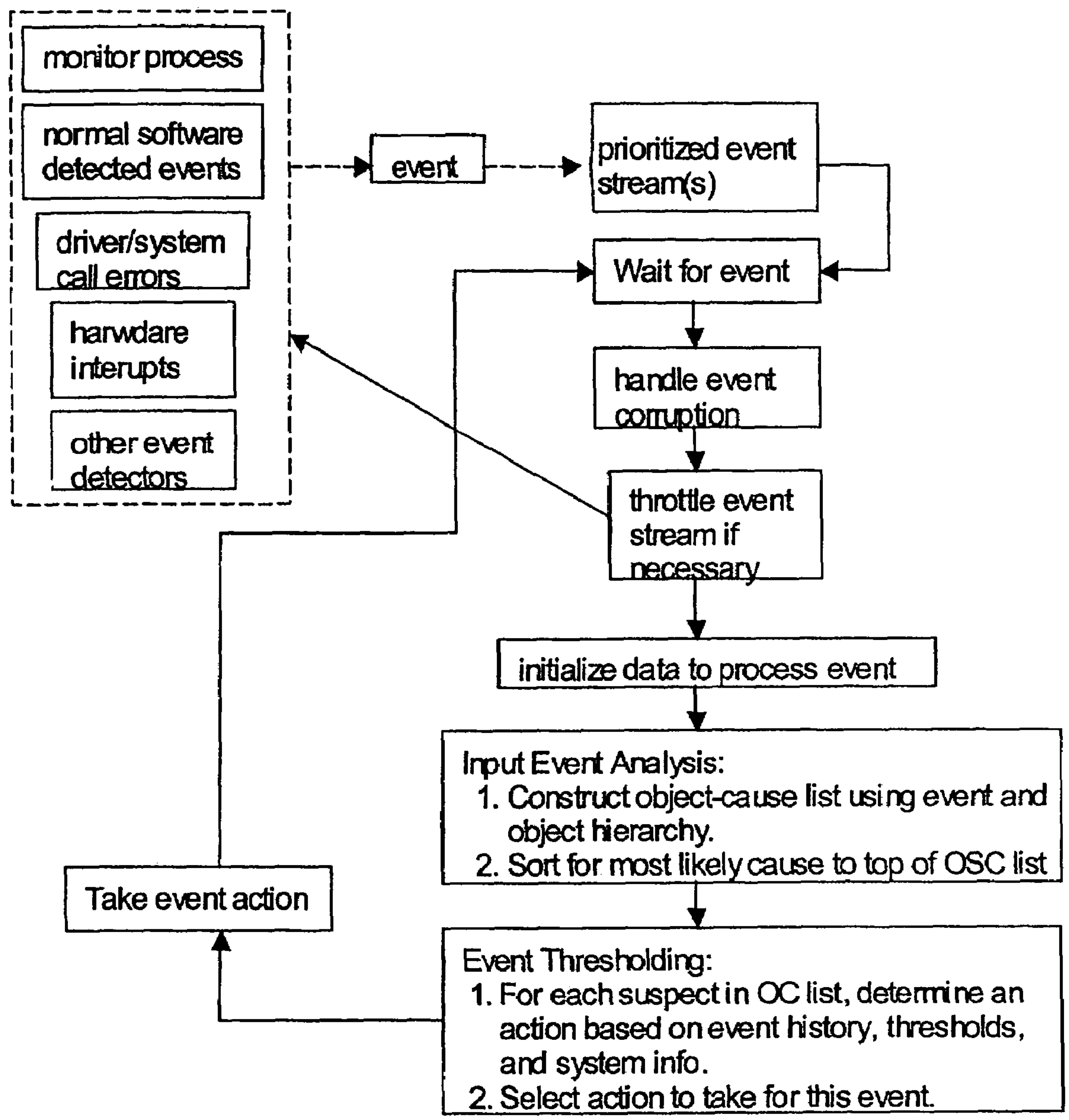
FIG. 4 illustrated an exemplary method of processing events for use in the fault detection and recovery system.

By way of example, FIG. 4 illustrates an overview of a process by which events may be handled and fault detection and recovery performed. In the illustrated example, sources of events may include, but are not limited to:

1) Monitor processes—a process that monitors functions in system and reports events for abnormalities encountered. Examples of functions monitored are, but are not limited to, heartbeats from processes, memory usage of processes, or hardware.

2) Normal software—as the software in the system processes it normal work, it reports events for errors encountered. Examples of errors are, but are not limited to, logic problems, communication problems, or data corruption.

3) Driver/system call errors—drivers in the system (e.g. to access/control hardware, provide interfaces to other subsystems, etc.) and system calls (e.g. file input/output, sockets, allocate memory, etc.) may encounter errors for which events are reported. Examples of these errors are, but are not limited to, hardware not responding, file system full, or no memory available.

4) Hardware interrupts—a hardware interrupt occurs when hardware failures occur. Examples of hardware failures are, but are not limited to, memory parity errors, power out of range, and temperature out of range.

5) Other event detectors—Examples of the other event detectors would be a routine testing of various hardware, software or communication components in the system. This is done to periodically ensure the proper function of these components even when normal operation of the system does not require these functions. Therefore, pro-active actions can be taken to correct potential problems before those components are required.

As illustrated, the handling of an event includes the steps of event analysis and event thresholding, which are described in greater detail hereinafter.

Figure 5:
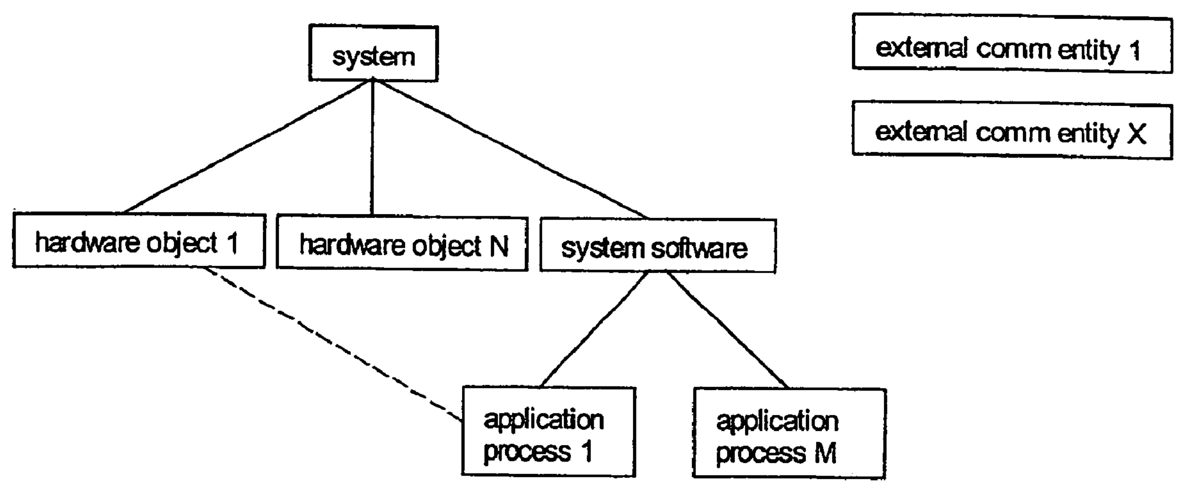
FIGS. 5-8 illustrate exemplary system object hierarchies for use in fault detection and recovery.

More specifically, for handing events, an approach is adopted wherein an object represents all entities of interest within the system. Objects are structured into a hierarchy. In addition, objects may be defined that represent entities external to that system with which the system is expected to establish communications. An exemplary system hierarchy is depicted in FIG. 5. Specifically, FIG. 5 illustrates a system that is decomposed into N hardware objects and a system software object (also be referred to as a family of software). The system software object is decomposed into the various M processes that run on that system. X objects are shown that represent entities external to the system with which the system may be expected to establish communications.

Within the system, a parent object is an object higher in the hierarchy than another related object (i.e., it can be reached from the object only following the solid connecting lines of FIG. 5 in the upward direction). Any object may have zero or more parent objects. The parent is decomposed into the objects that are below it. Therefore, in the example illustrated in FIG. 5, object "system" is the parent of objects "hardware object 1," "hardware object N," and "system software." Object "system software" is a parent of objects "application process 1" and "application process M." Note that object "hardware object 1" is not a parent ofobject "application process 1" even though it is higher in the hierarchy, since it cannot be reached from object "application process 1" only by following upward lines.

Similarly, a child object is an object lower in the hierarchy than another related object (i.e., it can be reached from the object only following the solid connecting lines of FIG. 5 in the downward direction). Any object may have zero or more children objects. The object is decomposed into the children objects below it, i.e., a child can be considered as "part of" its parent. Therefore, in the illustrated example, objects "hardware object 1," "hardware object N," and "system software" are all children of object "system." Objects "application process 1" and "application process M" are both children of object "system software." Note that object "application process 1" is not a child of "hardware object 1" even though it is lower in the hierarchy, since it cannot be reached from application process 1 only by following downward lines.

Still further, an associate object relationship is illustrated in FIG. 5 with the relationship being shown by a dashed line. Two objects are associated with each other if a special relationship exists between them that is not a parent-child relationship as described above. For example, an associate relationship exists when one object is expected to support another object. An associate relationship may cross any number of parent-child relationships. In the example illustrated in FIG. 5, an association exists between "application process 1" and "hardware object 1." This relationship may be required since "application process 1" is not part of "hardware object 1" and "hardware object 1" can not be decomposed into "application process 1." However, the system may require that "application process 1" provide all software interfaces to "hardware object 1." If this were the case, an associate relationship exists between these two objects.

Figure 6:
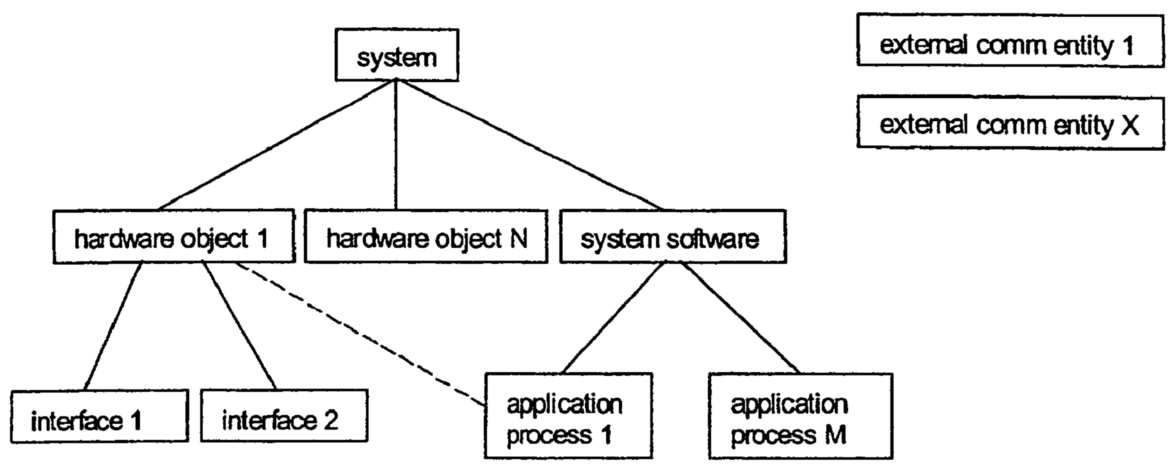

It is also possible to further decompose any of the objects shown in FIG. 5. For to example, object "hardware object 1" might be decomposed into objects that are interfaces to the outside world (e.g., "Hardware object 1" is a board that provides access to two Ethernets and it contains two physical interfaces or connectors). Two objects may then be defined as children of "Hardware object 1," each representing one of the Ethernet interfaces. FIG. 6 provides an example of this object model hierarchy.

For use in detecting and recovering from faults within the system, each object provides the ability to manage an event history. In turn, the event history list is managed by a leaky bucket list. As described previously, a leaky bucket is a counting device that has a specified drain rate. As events occur, the count in the leaky bucket is incremented and, as time elapses, the count in the leaky bucket is decremented as defined by its drain rate (e.g., 2 counts every minute). The drain rate is important, since events that occurred a week ago probably should not affect the count of events that occur today. A separate leaky bucket is preferably allocated for each type of event encountered for that object. Therefore, if a single object has experienced a communication time-out event and a software logic event, it would have two leaky buckets, one for each event type respectively. Once allocated, the leaky bucket is assigned an event type and a drain rate.

Importantly, to detect faults and provide fault tolerance and system stability, the objects and their family relationships are used to determine the most appropriate recovery action to take as a function of the events that are experienced by the objects of the system. To this end, an event handling ("EH") module is defined that waits for events to occur. The EH module may be a single process or a collection of cooperating processes and preferably is the highest priority module/process(es) in the system. This enables the EH module to handle events without (or at least with minimal) delay. Under normal circumstances the EH module should be dormant and awakened when an event is reported.

For prioritizing the handling of events within the EH module, the events may be assigned a priority number based on the type of the event. If prioritization is attempted, priorities are preferably assigned based upon how much system instability is introduced by an event should processing of the event be delayed. The difference between system stability and ability to provide a major function of the system may also be taken into consideration. By way of example only, events can be prioritized as follows from highest to lowest: 1) power failure, fuse pulled/blown, board removed, operating system (OS) panic, or other events that imply the system will be completely unstable if processing of the event is delayed; 2) most internal hardware/interface, software, and communication events not included in priority 1 that provide some level of instability to the system; and 3) the remainder of events that include external hardware/interface events, and communication events to external entities (these are the least important events since the impact on system stability is minimal in face of communication problems to external entities). If multiple events occur simultaneously, the EH module should handle them in priority order and, within the same priority level, on a first-in-first-out ("FIFO") order. By way of example, assuming that there are three event priorities as described, the EH module will process all priority 1 events in the order they occurred before priority 2 events, and all priority 2 events in the order they occurred before priority 3 events.

When the EH module is notified of an event, the EH module may handle the event by performing the following actions: 1) look for corruption in the event stream (e.g. sequence number violations) which requires corrective action on the event stream; 2) handle any throttling that may be necessary to control the rate of events into the EH module; 3) initialize data required by all EH module functions handling this event (e.g. time stamps, reporting object, etc.); 4) input event analysis to determine the list of objects that could have caused this event and how they could have caused this event; 5) event thresholding to analyze the objects on the list using event histories, thresholds, and other system state information to decide what action (if any) to take in response to this event; and 6) take the action chosen in the previous step. It is to be understood that the EH module need not perform all of these actions. Rather, certain actions may be omitted based upon the level of fault detection and correction desired.

To determine the list of objects that could have caused an event and how the event resulted from the object, the input event analysis step factors the event reported, the object the event is reported on, and the object hierarchies for the system. The developed list will be referred to hereinafter as the Object-Cause ("OC") list. When developing the OC list, each suspect object placed in the OC list has an event cause that indicates how this suspect could have caused this event. The OC list should be sorted with the most likely suspect/cause at the top of the OC list, and the least likely at the bottom of the OC list. When a suspect object is identified, generally as a result of reporting an event or having an associate relationship with the reporting object pertaining to the performance of the task that generated the event, the parent object, grandparent object, and other ancestor objects of the suspect object (i.e., up the hierarchy) may also be placed on the OC list. This is because the suspect is "part of" the parent, which in turn is "part of" its parent, and so on. Therefore, each of the ancestors could have caused the problem. It should be noted that the higher in the hierarchy an object is the more general the cause that is assigned to the object. In this way, many events at a low level usually blame common ancestors with the same causes having the effect of accumulating cause counts for the common ancestors. By way of further example, the following paragraphs provide a variety of event examples to demonstrate how the OC list is constructed.

If two processes are communicating, and a timeout during a message exchange occurs, one of the processes reports the timeout event. Assume Process B sent the message to process A and Process B times out waiting for the reply from Process A. Table 1 shows the resulting OC list for a communication timeout event.

TABLE 1

| Suspect | Cause | Reason |
|---|---|---|
| Process A | Timeout | Process took too long to process this message. |
| Process B | insane | Mismanaged its timer and a timeout fired incorrectly |
| System Software | Software problem | The underlying communication mechanism in the core system software/OS/communication library may have lost the message sent or the response. |
| System | Software corruption | Corruption has occurred in some set of the software on the system that is causing this problem. The problem could be in the communicating processes, in the system software, in memory resources, shared libraries, etc. |

In this example, the first column in Table 1 shows the suspect objects in the OC list, i.e., the object reporting the event, the associated object, and the ancestor objects. The second column provides a possible cause for the event, based upon the experiences of the system developers. The third column is a more detailed explanation of the how the suspect could have caused this event. It should be appreciated that the information that is reported within the third column is not part of the information required to proceed in this method—it is only provided here for supporting information. Furthermore, the suspect objects are ordered within the list, also based upon the experiences of the system developers, such that the first entry in the OC list is the most likely cause of this event. Note also that the ancestors of the first suspects appear in the list with very generalized causes.

Figure 7:
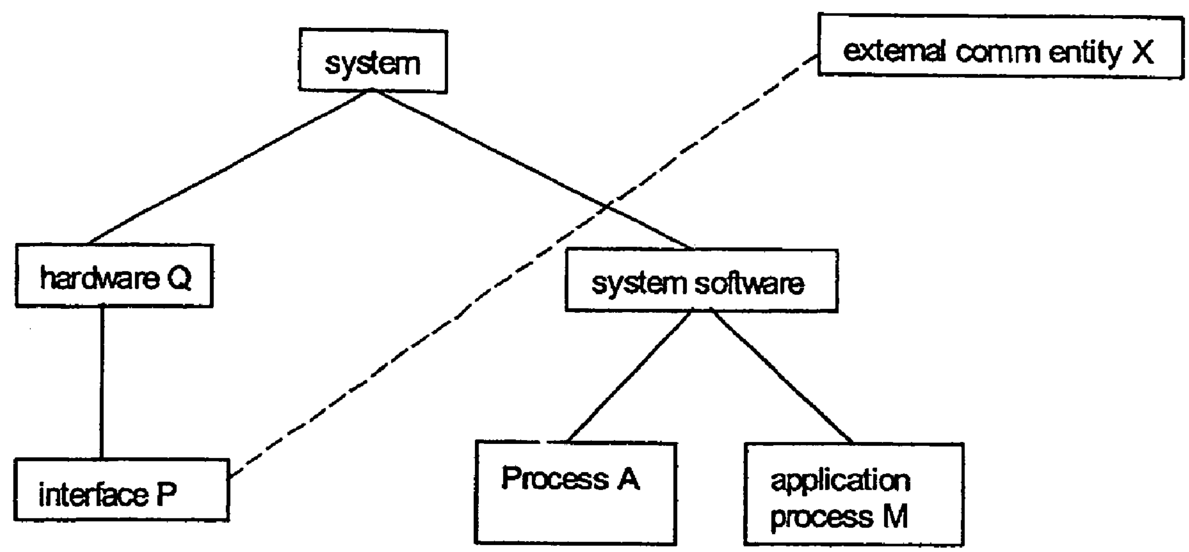

A further example is provided with reference to FIG. 7 where a process is communicating with an external entity, receives an unrecognized message from the external entity, and reports the bad message as an event to the EH module. In this example, External entity X sends a message to Process A in the system and Process A determines that the message is corrupted. When the OC list is created, the association between Interface P and External entity X is considered since this association implies Hardware Q and its child Interface P exist in the system and are used for communicating to External entity X. Because of this association, the interface (and its parent) is added to list OC list which is illustrated in Table 2.

TABLE 2

| Suspect | Cause | Reason |
|---|---|---|
| External Entity X | Bad message | The external entity sent and invalid message or network connecting the system to the external entity corrupted the message. |
| Process A | insane | Process has an internally corrupted the message or process has moved into an error leg where it is stuck a loop reporting events that are not true. |
| System Software | Software problem | The underlying communication mechanism in the core system software/OS/communication library may have corrupted the message. |
| interface P | Networking corruption | Something about the interface or it physical link with the network connecting it to External entity X corrupts the message. |
| hardware Q | Hardware failure | Some hardware glitch, buffering problem, or something with the processing of the message corrupts the message. |
| System | Software corruption | Corruption has occurred in some set of the software on the system that is causing this problem. The problem could be in the communicating processes, in the system software, in memory resources, shared libraries, etc. |

As before, the first column in Table 2 shows the suspect objects in the OC list (i.e., the reporting process object, the object with which the reporting object was interacting when the event resulted, and the related and ancestral objects), the second column provides a cause for the event/problem, and the third column is an explanation of the how the suspect could have caused this event.

A still further example is provided for a logic error detected by a process that functions to indicate something is internally wrong with a software module. During the explanation of this example, reference may be had to the following sample of software which illustrates a potential logic error in the case of a lower bound check on a variable "a" failing:

```
Integer a;
If ( a > 5 )
Then
    Do something
    If ( a < 5 )
    Then
        Should never get here unless a logic error exists
    End if
End if
```

If process A reaches the line "Should never get here unless a logic error exists," an error event is reported to the EH module and the OC list in Table 3 may be created.

TABLE 3

| Suspect | Cause | Reason |
|---|---|---|
| Process A | Logic error | Process has corrupted its variable through some sort of logic error. |
| System Software | Software problem | The underlying communication mechanism may have lost the message sent or the response. |
| System | Software corruption | Corruption has occurred in some set of the software on the system that is causing this problem. The problem could be in the communicating processes, in the system software, in memory resources, shared libraries, etc. |

As with the previous example, the first column in Table 3 shows the suspect objects in the OC list (i.e., only the reporting object and its ancestral objects). The second column provides a possible cause for the problem. The optional third column is an explanation of the how the suspect could have caused this event.

Figure 8:
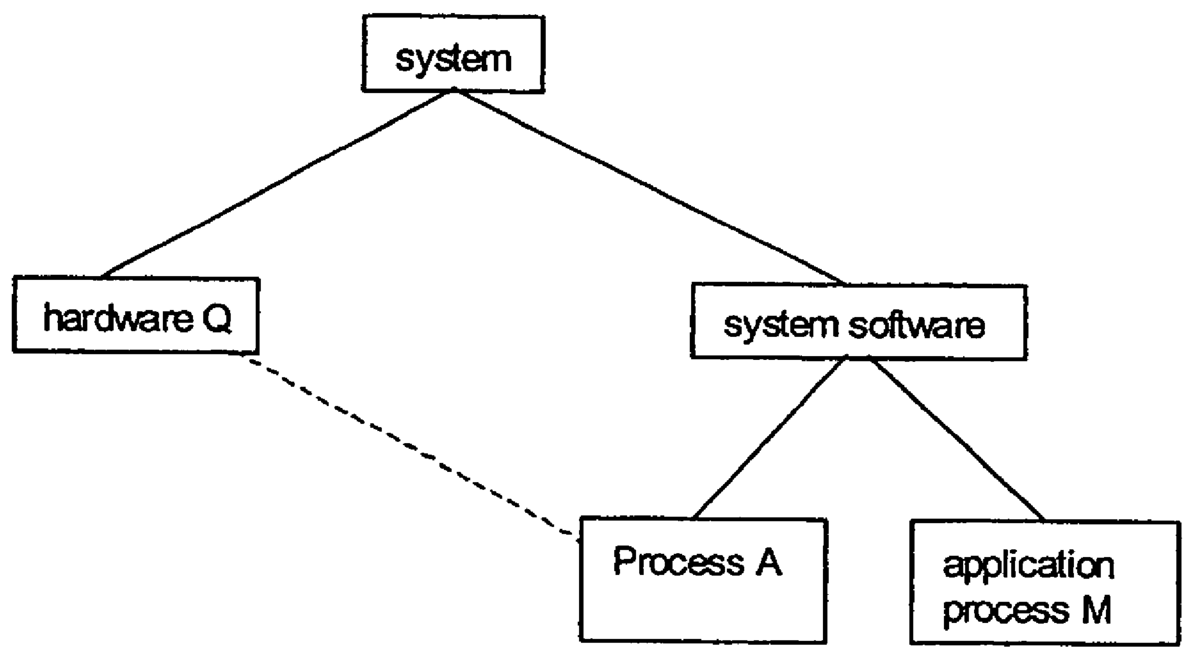

Yet another example is provided, with reference to FIG. 8, in which hardware Q provides some function for the system and Process A is the interface (i.e., reads/writes) to hardware Q. This association is illustrated in FIG. 8 by the dashed line. In the event that Process A fails trying to read from Hardware Q and Process A reports the hardware failure even, the OC list in Table 4 may result.

TABLE 4

| Suspect | Cause | Reason |
|---|---|---|
| hardware Q | Hardware read failure | Something failed in hardware when trying to read it. |
| System | Hardware failure | Problem in hardware in the system. Maybe clock provided by the system skewed, power glitched, or some interface device has failed. |
| Process A | insane | Process has an internally corrupted the message or process has moved into an error leg where it is stuck a loop reporting events that are not true. |
| System Software | Software problem | The underlying drivers in the core system software/OS/communication library may have failed causing the access failure. |
| System | Software corruption | Corruption has occurred in some set of the software on the system that is causing this problem. The problem could be in the communicating processes, in the system software, in memory resources, shared libraries, etc. |

Once again, the first column in Table 4 shows the suspect objects in the OC list, the second column provides how the suspect could have caused this problem, and the optional third column includes an explanation of the how the suspect could have caused this event. Note that in this example, the object "system" is in the OC list twice—once for a hardware problem (as a parent to "Hardware Q" object) and once for a software problem (as a grandparent to "Process A" object).

Correlation of events leading to a root cause occurs naturally through the construction of the OC list and thresholding. As depicted through the examples found above, many events at a low level blame common ancestors in the object hierarchy with the same causes. When thresholding occurs, and the counts accumulate for the common ancestor, actions may not only be taken on a lower-level object, but may rather be taken on a higher-level object.

To decide what action, if any, to take in response to an event, the suspect objects of the OC list are analyzed using event histories, thresholds, and other system state information. To this end, a leaky bucket algorithm is used to hold (and drain at the specified rate) the count for a given object-cause combination. Furthermore, a predefined list of implementable actions is provided. By way of example only, and without limitation, possible actions for inclusion on the list are: 1) Do nothing; 2) Generate an alarm to the user of the system about the event; 3) Reset the hardware and re-initialize it and its driver (if one exists) to a clean state; 4) Switch hardware to a spare that is ready to take over in case the current hardware fails; 5) Reload a driver for a hardware object; 6) Kill process and restart it; 7) Kill process and start on a different processor; 8) Restart the system software; 9) Reboot the system; 10) escalate system recovery; and 11) Power down the system. Preferably, each predefined action is assigned a preference value that indicates which action would be more preferable to take than another. Typically the more system impacting the action the more preferable it is. Therefore, in the list provided above by way of example, the actions may be prioritized where "Do nothing" is the least preferred action and "Power down the system" is the most preferred action.

In the example provided, action 10 picks the current level of system recovery as defined in FIG. 3. The recovery would begin at reboot (action 9) during the first interval and de-escalate to restart system software (action 8) during the second interval. A distinction is drawn between action 10 and the actions 8 and 9—even though 10 may, at any point in time, be implemented by 8 or 9. This distinction exists, since some events require action 8 or 9 specifically to recover, whereas other events should take whatever the current action is for escalation based on the amount of time the system has been cycling and stable. The longer the system has been cycling, the less severe the action that is required to recover the system.

As will be appreciated, the aforementioned action list may vary from system to system depending on the mix of hardware, software, and external entities. For example, most systems will typically need at least the following actions if no additional hardware is needed/supported by the system: 1) Do nothing; 2) Generate an alarm to the user of the system about the event; 3) Kill process and restart it; 4) Restart the system software; 5) Reboot the system; 6) Escalate using a recovery procedure as illustrated by FIG. 3; and 7) Power down the system. The escalation procedure for this example may begin at recovery (5) and as time goes on to recovery (4) and finally after a longer duration become recovery (3).

Similarly, for systems with some additional hardware, at least the following actions should be supported: 1) Do nothing; 2) Generate an alarm to the user of the system about the event; 3) Reset the hardware and re-initialize it and its driver (if one exists) to a clean state; 4) Reload a driver for a hardware object; 5) Kill process and restart it; 6) Restart the system software; 7) Reboot the system; 8) Escalate using the recovery procedure illustrated in FIG. 3; and 9) Power down the system. The escalation procedure for this example may begin at recovery (7) and as time goes on to recovery (6) and finally after a longer duration become recovery (5). It should also be appreciated that the priority order of the actions that is set forth above may also be varied from system to system.

For responding to events, it is also preferred that predefined sets of thresholds be provided which are used to compare the current counts in the leaky buckets to determine an action to take from the list. The threshold may be defined as a series (1 or more) of entries. By way of example, the entry may contain the following information: 1) Count; 2) Action to be taken; 3) Set of system conditions that must be true before this threshold can be selected. (the set may be empty if no other system conditions are required to select this action). Table 5 is an example of a threshold entry set for a process having communication problems.

TABLE 5

| Count | Action | Conditions |
|---|---|---|
| 4 | Kill and restart | none |
| 13 | Kill and start on a different processor | Other processor exists that is ready to run this process |

In the example provided in Table 5, the first column identifies the count that the leaky bucket must meet or exceed before the action is taken, the second column defines the action to take, and the third column defines any system conditions that must be true before this action can be selected. For example, assume the current count in the leaky bucket is 3. Since a value of 3 does not exceed any of the counts the default action is "Do nothing." If the count in the leaky bucket is 6, the process will be killed and restarted. If the count is 14, but there is not another processor to schedule the process on, the only entry that the count exceeds and all conditions are true is the first entry—hence the action implemented would be "kill and restart" the process. If the count was 13 and there was another process available to schedule the process, the action would be "Kill and restart on a different processor."

More specifically, for each entry in the OC list, the following steps are performed:

(1) If a leaky bucket to hold this combination of the object-cause does not exist:

(a) Allocate a leaky bucket to hold the counts for this object-cause combination;

and (b) Initialize the count and drain rates (2) Increment the count in the leaky bucket for this combination object-cause. (The drain of the counts may be done now if appropriate, or may be managed independently of the method).

(3) Find the entry in the threshold list where both the current count in this leaky bucket has exceeded the threshold entry count and all conditions in the threshold entry are true.

(a) If no entry is found, the default action should be "do nothing."

(b) If multiple entries are found the entry with the largest threshold count should be selected.

(c) If multiple threshold entries are still found, a selection criterion is applied (i.e. the first/last of the remaining matching entries is selected).

(4) Save the action of the selected threshold entry and the amount the leaky bucket count has exceeded the threshold entry count.

Once the action for each suspect in the OC list has been determined, one of the actions to be taken for the event is selected. This may be accomplished according to the following rules: 1) Select the action that is most preferable using the predefined preference values; 2) If rule "1" results in a multiple suspect actions being selected, select the action for the suspect in the OC list where its count has exceeded its selected threshold entry count by the largest amount. (i.e., this suspect is selected because it has exceeded this threshold count for the larger number of events—and therefore has needed this action for a longer period of time); and 3) In the event after both rule "1" and rule "2" have been applied and multiple suspects with the same action still exist, the order they appear in the OC list should be used to resolve the conflict. (i.e., the suspects were added into the OC list in the order that they most likely caused the event)

While specific aspects of the present invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

The invention is claimed as follows:

1. A method for automatically detecting and recovering from a fault in a microprocessor-based system, comprising:

capturing the fault, by the microprocessor-based system, as an event;

processing the event, by the microprocessor-based system, including thresholding the event and co-relating the event to a cause;

determining, by the microprocessor-based system, an elapsed time the microprocessor-based system has been running;

determining a recovery action, by the microprocessor-based system, as a function of the thresholding, the co-relating, and the elapsed time the microprocessor-based system has been running, and the recovery action is used to perform at least one of a restart and a cleanup of memory and performing, by the microprocessor-based system, the recovery action.

2. The method as recited in claim 1, wherein the fault is indicative of at least one of a heartbeat failure, a hardware error, a hardware malfunction, and a software process that is failing to respond.

3. The method as recited in claim 1, wherein the microprocessor-based system is defined as a hierarchical set of objects to model the software and hardware components of the microprocessor-based system.

4. The method as recited in claim 3, wherein the thresholding comprises using a leaky bucket algorithm and error counting.

5. The method as recited in claim 4, further comprising using relationships imposed by the hierarchical set of objects when determining a recovery action.

6. The method as recited in claim 5, where the objects represent at least one of hardware, software, and external entities the system communicates with.

7. The method as recited in claim 6, where event histories and system state information in combination with the objects in the hierarchy that span the hardware software and external entity domains are used to determine appropriate recovery actions for events in the system.

8. The method as recited in claim 7, where root cause correlation of events occurs across all domains and hierarchies of the system to determine recovery actions that provide for specific recoveries and system escalations.

9. The method as recited in claim 8, wherein sources of the events include at least one of monitor processes, software, driver/system call errors, hardware interrupts, and event detectors that proactively detect faults in unused components of the system.

10. The method as recited in claim 1, wherein the recovery actions is additionally used to perform at least one of a reset to a hardware module, a reset to a sub-assembly, and a releasing of resources that are marked unavailable.

11. A method for automatically detecting and recovering from a fault in a microprocessor-based system defined as a hierarchical set of objects to model software, hardware, and external entities the system communicates with, the method comprising:

capturing, by the microprocessor-based system, the fault as an event;

processing, by the microprocessor-based system, the event including thresholding the event and co-relating the event to a cause, the thresholding using a leaky bucket algorithm and error counting;

determining, by the microprocessor-based system, an elapsed time the microprocessor-based system has been running;

determining, by the microprocessor-based system, a recovery action as a function of the thresholding, the co-relating, and the elapsed time the microprocessor-based system has been running, relationships imposed by the hierarchical set of objects, event histories, and system state information, wherein root cause correlation of events occurs across all domains and hierarchies of the system to determine recovery actions that provide for specific recoveries and system escalations, and the recovery action is used to perform at least one of a restart and a cleanup of memory; and performing, by the microprocessor-based system, the recovery action.

12. The method as recited in claim 11, wherein the recovery action is additionally used to perform at least one of a reset to a hardware module, a reset to a sub-assembly, and a releasing of resources that are marked unavailable.

13. A method of automatically detecting and recovering from a fault in a microprocessor-based system, comprising:

capturing, by the microprocessor-based system, the fault as an event processing, by the microprocessor-based system, the event including thresholding the event and co-relating the event to a cause selected from a list of potential causes, the list of potential causes including potential hardware causes and potential software causes;

determining, by the microprocessor-based system, an elapsed time the microprocessor-based system has been running;

determining, by the microprocessor-based system, a recovery action as a function of the thresholding and the co-relating and the elapsed time the microprocessor-based system has been running, and the recovery action is used to perform at least one of a restart and a cleanup of memory; and performing, by the microprocessor-based system, the recovery action.

14. The method as recited in claim 13, wherein the microprocessor-based system is defined as a hierarchical set of objects to model software and hardware components of the microprocessor-based system.

15. The method as recited in claim 14, further comprising using relationships imposed by the hierarchical set of objects when determining the recovery action.

16. The method as recited in claim 13, wherein the recovery action is additionally used to perform at least one of a reset to a hardware module, a reset to a sub-assembly, and a releasing of resources that are marked unavailable.

17. A method of automatically detecting and recovering from a fault in a microprocessor-based system, comprising:

capturing, by the microprocessor-based system, the fault as an event;

processing, by the microprocessor-based system, the event including thresholding the event and co-relating the event to a cause selected from a list of potential causes, the list of potential causes including potential causes internal to the microprocessor-based system and potential causes external to the microprocessor-based system;

determining, by the microprocessor-based system, an elapsed time the microprocessor-based system has system has been running;

determining, by the microprocessor-based system, a recovery action as a function of the thresholding and the co-relating and the elapsed time the microprocessor-based system has been running, and the recovery action is used to perform at least one of a restart and a cleanup of memory; and performing, by the microprocessor-based system, the recovery action.

18. The method as recited in claim 17, wherein the microprocessor-based system is defined as a hierarchical set of objects to model software and hardware components of the microprocessor-based system.

19. The method as recited in claim 18, further comprising using relationships imposed by the hierarchical set of objects when determining the recovery action.

20. The method as recited in claim 17, wherein the recovery action is additionally used to perform at least one of a reset to a hardware module, a reset to a sub-assembly, and a releasing of resources that are marked unavailable.

21. A method for recovering from a fault in a microprocessor-based system, the method comprising:

capturing, by the microprocessor-based system, the fault as an event;

determining, by the microprocessor-based system, an elapsed time the microprocessor-based system has been running;

determining, by the microprocessor-based system, a recovery action as a function of the elapsed time the microprocessor-based system has been running, and the recovery action is used to perform at least one of a restart and a cleanup of memory; and performing, by the microprocessor-based system, the recovery action.

22. The method as recited in claim 21, wherein the microprocessor-based system is defined as a hierarchical set of objects to model software and hardware components of the microprocessor-based system and relationships imposed by the hierarchical set of objects are used to determine the recovery action.

* * * * *